United States Patent [19]

Druell

[11] 4,095,915

[45] Jun. 20, 1978

[54] CANVAS CORNER MOUNT

[75] Inventor: Carr F. Druell, Kennewick, Wash.

[73] Assignee: The Raymond Lee Organization, Inc., New York, N.Y. ; a part interest

[21] Appl. No.: 801,228

[22] Filed: May 27, 1977

[51] Int. Cl.$^2$ .............................................. G09F 1/10
[52] U.S. Cl. ..................................... 403/402; 40/156; 403/403
[58] Field of Search ................. 40/152.1, 156, 158 A, 40/152; 403/401, 402, 403, 231; 160/369, 381

[56] References Cited

U.S. PATENT DOCUMENTS

| | | | |
|---|---|---|---|
| 631,352 | 8/1899 | Wilding | 403/403 X |
| 1,045,815 | 12/1912 | Courville | 403/231 |
| 1,694,667 | 12/1928 | Peck et al. | 403/403 |
| 1,758,955 | 5/1930 | Lovejoy | 403/231 X |
| 1,791,098 | 2/1931 | Lartz | 40/158 A |
| 1,820,205 | 8/1931 | Wilson | 403/231 |

FOREIGN PATENT DOCUMENTS 181,217  6/1922  United Kingdom ................ 403/402

Primary Examiner—Werner H. Schroeder
Assistant Examiner—Conrad L. Berman
Attorney, Agent, or Firm—Daniel Jay Tick

[57] ABSTRACT

A single sheet of rigid bendable material of rectangular configuration has a triangular notch cut along a center line from one edge thereof and a narrow rectangular notch cut along the center line from the opposite edge thereof. The sheet is folded along a line perpendicular to the center line at the apex of the notch of the triangular notch and is then folded in the opposite direction along a line perpendicular to the center line along the innermost edge of the rectangular notch. The sheet is then folded along the center line to close the triangular notch whereby the two parts of the first edge are perpendicular to each other and the rectangular notch becomes a right angle.

2 Claims, 5 Drawing Figures

CANVAS CORNER MOUNT

BACKGROUND OF THE INVENTION

The present invention relates to a canvas corner mount.

Objects of the invention are to provide a canvas corner mount of simple structure, which is inexpensive in manufacture, used with facility, convenience, rapidity, complete safety, and functions efficiently, effectively and reliably to secure a canvas to a frame without damage to the frame or the canvas, without the frame corners becoming loose, spreading or gapping, preventing stretching of the canvassed frame corners from spreading or gapping and providing an attractive and pleasant appearing fixture.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
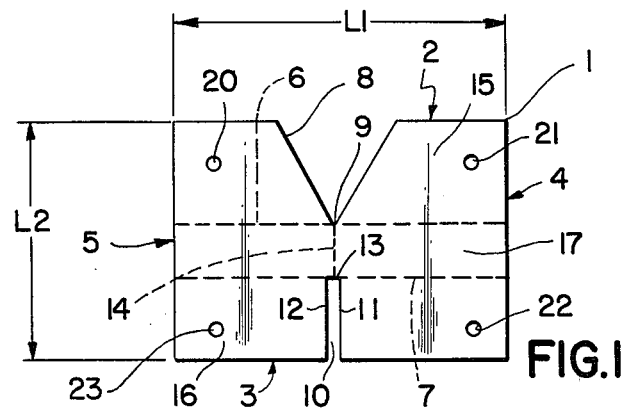
FIG. 1 is a plan view of an embodiment of the canvas corner mount of the invention in sheet form, prior to folding.

The canvas corner mount of the invention comprises a single sheet 1 of substantially rigid bendable material of rectangular configuration, as shown in FIG. 1. Any suitable material such as, for example, aluminum is utilized. The sheet 1 has first and second spaced parallel edges 2 and 3 of predetermined length L1 and third and fourth spaced parallel edges 4 and 5 of a length L2, shorter than the predetermined length. The third and fourth edges 4 and 5 are perpendicular to, and join, the first and second edges 2 and 3.

The sheet 1, as shown in FIG. 1, has first and second spaced parallel imaginary lines 6 and 7, respectively, indicated by broken lines, parallel to the first and second edges 2 and 3. The first imaginary line 6 is the same distance from the first edge 2 as the second imaginary line 7 is from the second edge 3.

A triangular notch cutout 8 is provided in the sheet 1, as shown in FIG. 1, and has its vertex 9 on the first imaginary line 6 and its base opposite said vertex opening at the first edge 2 of the sheet.

A narrow rectangular notch cutout 10 is provided in the sheet 1, as shown in FIG. 1, and extends from the second imaginary line 7 to the second edge 3. The rectangular notch 10 has long sides 11 and 12 parallel to the third and fourth edges, a short side 13 on the second imaginary line 7, and another short side opening on the second edge 3.

The cutouts 8 and 10 are symmetrical about a center line 14 shown by broken lines in FIG. 1, parallel to the third and fourth edges 4 and 5 and equidistant therefrom.

Figure 2:
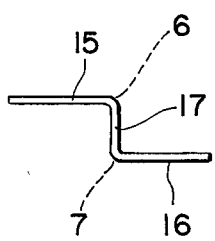
FIG. 2 is an end view of the embodiment of FIG. 1 after folding.

The sheet 1 is folded along the first imaginary line 6, in the manner shown in FIG. 2, to position a first area 15 (FIGS. 1 and 2) between the first imaginary line and the first edge 2, perpendicular to the remainder of the sheet, as shown in FIG. 2. The sheet 1 is then folded in the opposite direction along the second imaginary line 7 (FIGS. 1 and 2) to position a second area 16, between said second imaginary line and the second edge 3, perpendicular to a third area 17, as shown in FIG. 2, between the imaginary lines (FIGS. 1 and 2). The second area 16 thus extends parallel to, and in the opposite direction from, the first area 15, as shown in FIG. 2.

Figure 4:
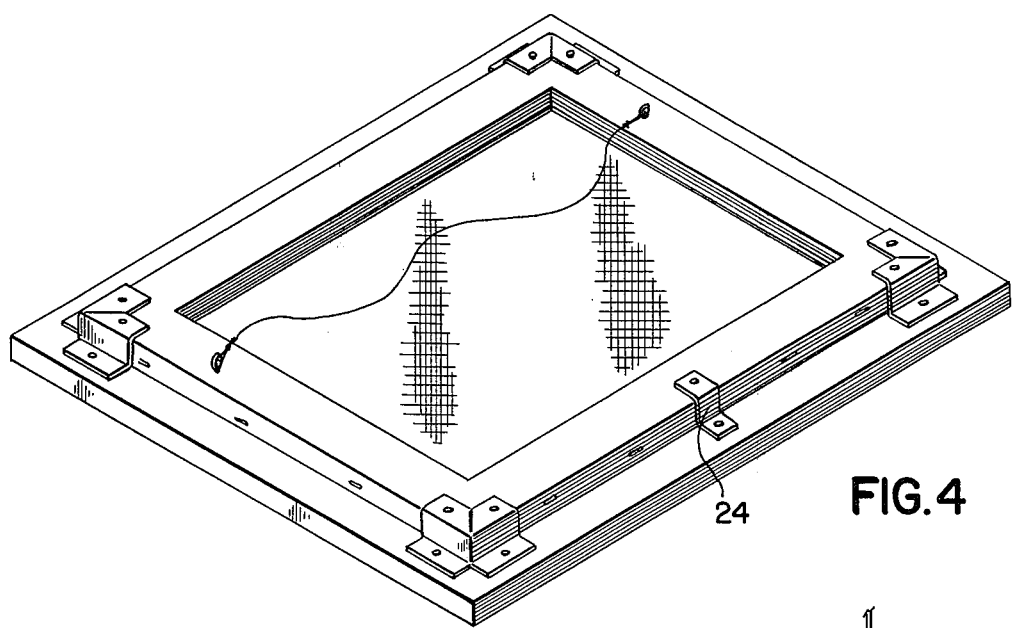
FIG. 4 is a perspective view of four canvas corner mounts of the invention utilized to secure a canvas to the four corners of a frame.
Figure 3:
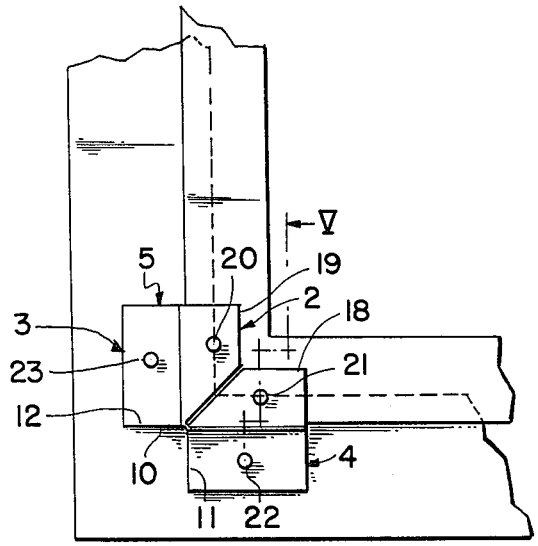
FIG. 3 is a view, on a reduced scale, of the embodiment of Fig. 1 in its final form as utilized to affix a canvas to a frame.
Figure 5:
FIG. 5 is a view, taken along the lines V—V, of FIG. 3.

The sheet is then folded along the center line 14 to close the trianular notch cutout 8 whereby the two parts 18 and 19 (FIG. 3) of the first edge 2 are perpendicular to each other, as shown in FIGS. 3 and 4, and the rectangular notch 10 becomes a right angle, as shown in FIGS. 3 and 4.

Bores 20, 21, 22 and 23 (FIGS. 1 and 3) are formed through the sheet to accommodate nails, brads, screws, or the like, utilized in affixing the corner mount to the canvas and to the frame.

A support clip 24 may be utilized between the corner mounts on extra long frames, as shown in FIG. 4. The support clip 24 is a strip of bendable material bent twice at right angles to form a center section and a pair of end sections extending perpendicular from opposite ends of the center section in opposite directions.

The corner mounts may be formed by injection molding in cluster dies to facilitate high rate production. This eliminates the bending and cutout steps of production. It even eliminates the narrow slit in the area normally formed by the triangular notch cutout after bending.

While the invention has been described by means of a specific example and in a specific embodiment, I do not wish to be limited thereto, for obvious modifications will occur to those skilled in the art without departing from the spirit and scope of the invention.

I claim:

1. A canvas corner mount, comprising a single sheet of substantially rigid bendable material of rectangular configuration having first and second spaced parallel edges of predetermined length and third and fourth spaced parallel edges of shorter than the predetermined length perpendicular to and joining the first and second edges, said sheet having first and second spaced parallel imaginary lines parallel to the first and second edges, the first imaginary line being the same distance from the first edge as the second imaginary line is from the second edge, a triangular notch cutout in said sheet and having its vertex on the first imaginary line and its base opposite said vertex opening at said first edge, and a narrow rectangular notch cutout in said sheet and extending from the second imaginary line to the second edge, the rectangular notch having long sides parallel to the third and fourth edges, a short side on the second imaginary line and another short side opening on the second edge, said cutouts being symmetrical about a center line parallel to the third and fourth edges, said sheet being folded along the first imaginary line to position a first area between the first imaginary line and the first edge perpendicular to the remainder of the sheet and being folded in the opposite direction along the second imaginary line to position a second area between the second imaginary line and the second edge perpendicular to a third area between the imaginary lines and extending parallel to and in the opposite direction from the first area, and said sheet being folded along the center line to close the triangular notch cutout whereby the two parts of the first edge are perpendicular to each other and the rectangular notch becomes a right angle.

2. A canvas corner mount as claimed in claim 1, further comprising bores formed through the sheet to accommodate nails.

* * * * *